W. J. BEST & W. M. MERVIN.
BROILER PAN.
APPLICATION FILED DEC. 2, 1914.
1,159,890.
Patented Nov. 9, 1915.
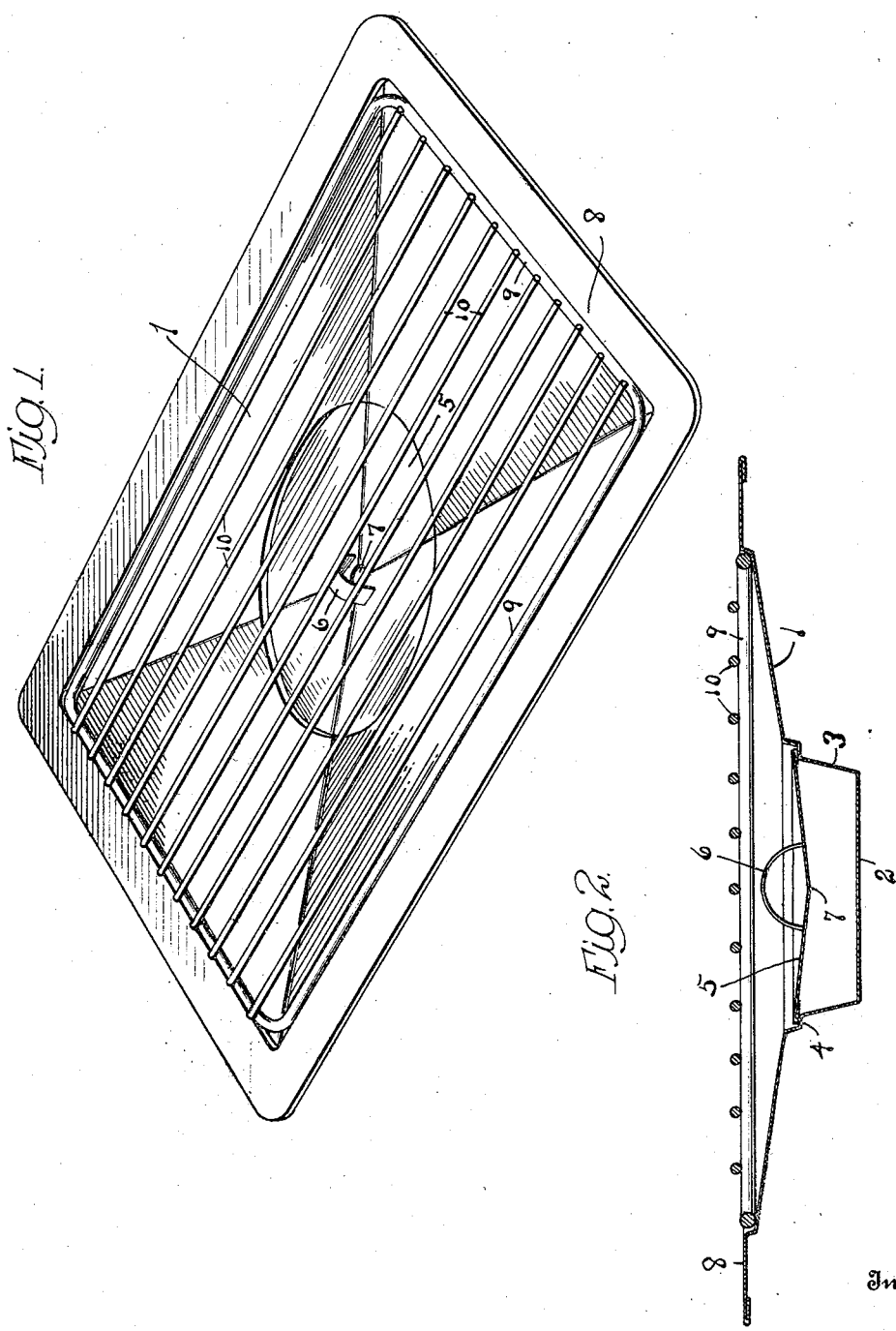
Witnesses
E. R. Barrett
H. W. Kreinbring
Inventors
William J. Best and William M. Mervin.
By Pagelsen and Spencer.
Attorneys.

UNITED STATES PATENT OFFICE.

WILLIAM J. BEST AND WILLIAM M. MERVIN, OF DETROIT, MICHIGAN.

BROILER-PAN.

1,159,890.  Specification of Letters Patent.  Patented Nov. 9, 1915.

Application filed December 2, 1914. Serial No. 875,092.

*To all whom it may concern:*

Be it known that we, WILLIAM J. BEST and WILLIAM M. MERVIN, citizens of the United States, and residents of Detroit, in the county of Wayne and State of Michigan, have invented a new and Improved Broiler-Pan, of which the following is a specification.

This invention relates to pans adapted for use with stoves and ranges wherein the heat for broiling meats and other foods is obtained from burners so mounted as to be above the article to be prepared, and its object is to provide a simple and efficient device which will prevent the fats which flow from the hot meats from burning, and which may be easily cleaned.

In the accompanying drawing, Figure 1 is a perspective view of this improved broiling pan. Fig. 2 is a transverse section thereof.

Similar reference characters refer to like parts throughout the several views.

The flame employed to properly broil meats, such as steaks and chops, often sets fire to the fats which accumulate in the bottom of the broiling pan, thus ruining the food being prepared. The present invention contemplates forming a closed receptacle or well by depressing one portion of the bottom of the pan, to which depression the pan 1 slopes from all sides. While the depression is preferably in the middle of the pan, it may be at any other desired location.

The depression is preferably formed with a bottom 2 and side 3, the latter having a ledge 4 to support a closure or cover 5 having a handle 6 and perforation 7 toward which the closure preferably slopes from all sides. The pan is preferably formed with a raised border 8 which positions the gridiron formed of the marginal frame 9 and cross bars 10.

When a piece of fat meat is on the gridiron and subject to heat from above, the excess fats will drip down onto the pan and flow toward the central depression. If the fats cannot flow between the edge of the closure and the ledge 4, they will flow over the closure to the opening 7 therein. The handle 6 extends over the opening 7 and prevents direct action of the flame on the fats within the well or depression. After the meat has been cooked, these fats can be poured over the meat or used in any other desired manner. Because of the entire absence of sharp corners, this device can easily be cleaned.

The sizes and proportions of the various parts will vary according to the uses to which the broiler is to be put and according to the size of the stove or range where it is to be used.

We claim:—

1. The herein described device for broiling meats consisting of a pan having a raised border, a circular imperforate depression and a portion between the border and depression sloping downwardly from all sides toward said depression, a perforated cover for said depression, and a gridiron extending across above said depression within the raised border of the pan.

2. The herein described utensil for broiling meats consisting of a pan having a raised border and an imperforate depression, the portion between them sloping downwardly from all sides toward said depression, the upper edge of the depression being formed with a ledge, a closure resting on said ledge and sloping downwardly from all sides toward an aperture, and a gridiron extending across within the said border of said pan above the closure.

3. The herein described utensil for broiling meats consisting of a pan having an imperforate depression and sloping downwardly from all sides toward said depression, a closure for said depression and a gridiron extending across said pan above the closure.

4. The herein described utensil for broiling meats consisting of a pan having an imperforate depression and sloping downwardly from all sides toward said depression, and a closure for said depression sloping downwardly from its circumference toward a perforation through which melted fats may flow and collect in said depression.

In testimony whereof we sign this specification in the presence of two subscribing witnesses.

WILLIAM J. BEST.
WILLIAM M. MERVIN.

Witnesses:
HUGO W. KREINBRING,
EDWARD N. PAGELSEN.